UNITED STATES PATENT OFFICE.

MATHEW E. ROTHBERG, OF WESTMONT, PENNSYLVANIA.

FIRE-BRICK AND LINING OF REFRACTORY CHARACTER.

SPECIFICATION forming part of Letters Patent No. 641,551, dated January 16, 1900.

Application filed May 8, 1899. Serial No. 716,052. (No specimens.)

*To all whom it may concern:*

Be it known that I, MATHEW E. ROTHBERG, a citizen of the United States, and a resident of Westmont, in the county of Cambria and State of Pennsylvania, have invented certain new and useful Improvements in Fire-Bricks and Linings of Refractory Character; and I do declare the following to be a full, clear, and exact description of the invention, such as will enable others skilled in the art to which it appertains to make and use the same.

This invention has relation to "fire-bricks" and linings or bricks and linings of refractory character used in the manufacture of steel and in other arts in which are employed furnaces in which a high degree of temperature is maintained. The material heretofore commonly employed for such bricks or linings has been of silicious character, such as silica brick or mixtures of silicious sand or lime of magnesia, or both combined. These materials have been used either in the form of bricks or in mass. These two principal kinds of linings being either acid (silicious) or basic (consisting of lime or magnesia) in either case are affected by the melting down of the charge in the furnace. If the lining is acid or silicious, it will be fluxed by any bases in the charge, such as oxid of iron or lime, and rapidly washed away. If it is basic in character, it will be fluxed by any acid substance, such as silica.

The object of my present invention is to provide a fire-brick or lining which is not only highly refractory in its nature but which will not be affected or fluxed by the melting down of the charge, being neither acid nor basic but neutral in its character.

With this object in view the invention consists in a fire-brick or lining consisting, essentially, of alumina (oxid of aluminium) and magnesia (oxid of magnesium) and incidentally thereto a small percentage of binding material or bond consisting of a material more fusible than either alumina or magnesia. The character of the brick or lining is also not materially affected by the presence of small quantities of other substances in combination, provided the brick or lining is primarily a magnesia-alumina brick or lining.

Alumina has a very high heat-resisting power, as well as a great inertness with respect to combining with any other substance. Magnesia is also very refractory and very basic, and when these two materials are united a material is produced which is very superior for the purpose, containing as it does these combined properties. The alumina protects the magnesia from being fluxed by any silica present in the slags, and the combined infusible properties of the two substances enable the compound to withstand a higher degree of heat than any other material or substance heretofore known and used. Magnesia alone in a furnace-lining is fluxed by the action of the silica of the slags in accordance with the reaction: $MgO + SiO_2 = MgSiO_3$. When, however, the magnesia is mixed with about half its weight of alumina, which has been previously calcined and rendered extremely infusible and inert thereby, the particles of alumina surround the magnesia particles and render them much less liable to form a chemical union with the silica. The result is a lining not only very neutral but also very infusible.

In manufacturing my improved bricks and lining I mix together pure alumina and pure magnesia, together with a small proportion of a more fusible substance, which will act as a bond to bind together the particles of magnesia and alumina. Any substance, such as oxid of iron or silica, will answer, provided it is more fusible than the principal elements of the compound and will by the action of heat react upon them sufficiently to stick their particles together. The particular proportions are not essential. I prefer, however, to use about equal parts of magnesia and alumina and about three per cent. of the bond. After a thorough mixing the compound is pressed or molded, dry or semi-dry, into the form of bricks or blocks of the desired shape and is burned at a high temperature, or it may be used loose in a mass.

Having thus described my invention, what I claim as new, and desire to secure by Letters Patent, is—

1. A refractory fire-brick or lining, composed of pure alumina and pure magnesia in the proportions of about equal parts of each, together with about three per cent. of a bond more fusible than either of said principal ingredients, substantially as specified.

2. A fire-brick or lining of refractory and neutral character, composed principally of alumina and magnesia, in the proportions of about equal parts of each, substantially as specified.

In testimony whereof I affix my signature in presence of two witnesses.

MATHEW E. ROTHBERG.

Witnesses:
EDW. E. LEVERGOOD,
JOHN H. BROWN.